United States Patent [19]

Aoki

[11] Patent Number: 5,805,955
[45] Date of Patent: Sep. 8, 1998

[54] IMAGE FORMING APPARATUS AND METHOD WITH DIVISIONAL IMAGE FORMING PROVISIONS

[75] Inventor: Minoru Aoki, Kawasaki, Japan

[73] Assignee: Ricoh Company, Ltd., Tokyo, Japan

[21] Appl. No.: 738,696

[22] Filed: Oct. 28, 1996

[30] Foreign Application Priority Data

Oct. 27, 1995 [JP] Japan .................................... 7-280386

[51] Int. Cl.$^6$ ........................ G03G 15/041; G03G 21/00
[52] U.S. Cl. ............................ 399/45; 399/86; 399/183; 399/197; 399/370; 358/449; 358/453
[58] Field of Search ................... 399/45, 81, 86, 399/183, 197, 370, 384; 358/449, 451, 453

[56] References Cited

U.S. PATENT DOCUMENTS

| 4,631,596 | 12/1986 | Yaguchi | 358/449 |
| 4,739,368 | 4/1988 | Lachut et al. | 399/183 |
| 4,977,463 | 12/1990 | Fukuda | 358/449 X |
| 4,984,020 | 1/1991 | Adachi et al. | 399/81 X |
| 5,150,224 | 9/1992 | Mizude et al. | 358/449 |
| 5,267,009 | 11/1993 | Takada et al. | 399/386 |
| 5,287,159 | 2/1994 | Sakakibara | 399/86 |
| 5,289,236 | 2/1994 | Yoshino | 399/86 |
| 5,311,259 | 5/1994 | Moriya et al. | 399/86 |
| 5,610,728 | 3/1997 | Sobue | 358/449 |
| 5,666,609 | 9/1997 | Aoki | 399/183 |

Primary Examiner—Nestor R. Ramirez
Attorney, Agent, or Firm—Oblon, Spivak, McClelland, Maier & Neustadt, P.C.

[57] ABSTRACT

An image forming apparatus and method form respective carrier images corresponding to at least one specified area of a manuscript image of a manuscript document by designating at least one specified area of the manuscript image with a user-actuated divisional image forming key configured to designate the at least one specified area and deciding at least one of a paper size of a recording paper and a number of sheets of the recording paper in accordance with a size and a number of the at least one specified image area.

17 Claims, 5 Drawing Sheets

IMAGE FORMING APPARATUS AND METHOD WITH DIVISIONAL IMAGE FORMING PROVISIONS

BACKGROUND OF THE INVENTION

1. Field of the Invention

The present invention relates to an image forming apparatus, and in particular, an image forming apparatus employed in a copying machine, a facsimile device, etc. capable of dividing an image formed on a manuscript document and forming the image thus divided on a recording paper.

2. Description of the Related Art

For instance, in the case of a copying machine, images 111a and 111b respectively formed on the right and left sides of a manuscript document 111, opened when needed, can be copied respectively on two sheets of paper P1 and P2, as shown in FIG. 5.

In such copying machines capable of performing divisional copying, the divisional copying mode of operation is designated by an operator pushing a division key mounted on an operation board. However, when the divisional copying is designated, other functions such as an automatic recording paper selecting function and/or a magnifying/reducing and recording paper designating function cannot be performed. Namely, only equal-size copying can be done when in the divisional copying mode of operation.

Furthermore, regarding the recording paper to be copied, when the size of the manuscript document to be copied is A3, the images on both sides are recorded on two sheets of A4-size recording paper. Similarly, when the side of the manuscript document is B4, the images are recorded on two sheets of B5, and when the manuscript size is A4, the images are recorded on two sheets of A5. Thus, the size of recording paper on which the manuscript images are to be copied is respectively designated automatically.

Some copying machines exist in which the surface of the long-size manuscript document, elongated in the conveying direction, can be partially copied easily only for the needed area on some occasions. In such a copying machine, when a long document copying mode selecting button is pushed, the operation of conveying the long-size manuscript document set on a predetermined position is started. When a portion of the manuscript document needed to be copied arrives at the position of a pointer provided in the copying machine, a copy starting button is pushed. At this time, an exposure lamp is lit, and the feeding of the manuscript document is started such that the manuscript document surface is scanned and the manuscript document is copied only for the needed area thereof. In such manner, each time when the area of the manuscript document needed to be copied arrives at the position of the pointer, the copy starting button is pushed and thereby the copied sheet for the needed area can be obtained on every occasion.

On the other hand, regarding facsimile devices, there exists devices capable of transmitting and receiving even A1-size manuscript document at maximum full length and also capable of transmitting the image of the manuscript document 121 in three divided portions as shown in FIG. 6. The divided image is reproduced without reducing the image of the manuscript document when the rolled paper of A4-size width is set in the receiving side facsimile device at the time of transmitting the manuscript document of A1-size at maximum enabled to be transmitted from the transmitting side facsimile device.

The same situation exists for B4-size documents. On that occasion, when the rolled paper of A3-size width is set in the receiving side facsimile device, the image is divided into two portions and transmitted as shown in FIG. 7.

Furthermore, a dotted line is included on the transmitted portions for superposing the image on the several portions of the respective images, such that the separate images may later be combined by an operator.

However, as will be addressed by the present invention, in the case of employing the copying machine capable of divisionally copying respectively the images formed on the opened and looked-at manuscript document such as a book, a pamphlet, a notebook, or the like as shown in FIG. 5 on two sheets of recording paper, the respective copyable areas on the manuscript document are limited to the right and left image areas on the opened and looked-at manuscript document. Consequently, there arises a problem that an operator tries to copy only the necessary portion on the long manuscript document longitudinally (extended in the conveying direction), and the operator cannot copy the document.

And further, regarding the size and sheets number of the recording paper to be fed, if the size of the opened and looked-at manuscript document is, for instance, A3-size as mentioned above, two sheets of the A4-size recording paper must be used. Namely, the size and number of recording paper sheets are limited to what was previously decided.

Furthermore, in the case of using the copying machine capable of copying only the necessary portion of the long manuscript document as mentioned above, the machine can designate the necessary portion to be copied on the manuscript document and copy that portion. However, since the machine is functionally incapable of feeding the recording paper of the size corresponding to that of the area of the manuscript document to be copied, there arises a problem that a rear edge side of the image to be recorded is put outside of the recording paper and thereby the image cannot be recorded properly.

In the case of using the facsimile device capable of divisionally transmitting the image on the manuscript document of a large size, like A1 size, since the number of divisions is determined automatically in accordance with the width of the rolled paper previously set in the receiving-side facsimile device, the center of the most important image portion comes on the jointing part of the divisional copying area or some occasions. Consequently, there arises a problem that an important part may become unclear on such occasions.

The present invention has been made in consideration of the above-mentioned actual circumstances and troublesome matters to be solved.

SUMMARY OF THE INVENTION

Accordingly, one object of this invention is to provide a novel image forming apparatus with divisional image forming provisions that solve the above-described limitations of the prior art.

It is another object of the present invention to provide a method of forming an image corresponding to the necessary, important part of the manuscript document on the recording paper in a continuous state without making a not-copied area.

It is still another object of the present invention to provide an image forming apparatus that prevents a part of the important image portion from occurring on a joining part of the divisional copying area.

It is still another object of the present invention to provide an image forming apparatus capable of forming an image corresponding to the necessary part of the manuscript document on the recording paper in a continuous state without making not-copied area.

It is still another object of the present invention to provide an image forming apparatus capable of preventing a part of the important image portion from coming on the joining part of the divisional copying area.

These and other objects are accomplished with an image forming apparatus (first status) comprising:

manuscript document conveying means, recording paper conveying means, an operation displaying part having a divisional image forming key employed when a part of the manuscript document image is formed on an image carrier, and image forming means for forming an image on the image carrier, where the image forming apparatus further comprises, first designation means for designating the position of conveying direction for the manuscript document on specified image area by pushing the divisional image forming key when the front edge and the rear edge of the conveying direction for the manuscript document on the specified image area on which the image of the manuscript document being conveyed by the manuscript document conveying means should be formed respectively arrive at the designated positions, and decision means for deciding either one of paper size or papers number of the recording paper conveyed by the recording paper conveying means in accordance with the size and number of the specified image area both designated by the designation means.

In such structure, the operator can optionally designate the specified area for forming thereon the image on the manuscript document only by pushing the divisional image forming key when the front edge and the rear edge of the manuscript document's specified area in the manuscript document conveying direction during the time period when the manuscript document is conveyed. Thereby, the image on the specified area can be formed on the recording paper without disappearing half way through.

When a number of the specified areas thus designated by the divisional image forming key is plural, the size of the recording paper conveyed by the recording paper conveying means is automatically determined in accordance with the size and the number of the specified areas. Otherwise, in the case of forming the image on the respective specified areas sheet by sheet on the recording paper, the number of sheets of recording paper is determined automatically.

Consequently, the operator can form the image effectively only by designating the specified area portion to be formed thereon, without designating the size and the number of recording sheets of paper.

Furthermore, it may be desirable for the operator to select the size of the recording paper by pushing the recording paper size before starting the image forming operation. In this case, the rear edge of the specified area is determined in accordance with the size of the recording paper only by pushing the divisional image forming key only when the front edge of the specified area of the manuscript document in the document conveying direction arrives at the designated position during the time period when the manuscript document is moving.

In such a structure, the image forming apparatus (second status) includes second designation means for designating the position of conveying direction for the manuscript document of a specified image area in accordance with a signal inputted by pushing the divisional image forming key when the front edge of the conveying direction for the manuscript document on the specified image area on which the image of the manuscript document being conveyed by the manuscript document conveying means should be formed arrives at the designated position, and the length of the conveying direction of the recording paper selected by the recording paper size selecting key.

Furthermore, it may be desirable for an operator to input the length of the specified area in the manuscript document conveying direction on which the image has to be formed before starting the image forming operation and pushes the divisional image forming key when the front edge of the manuscript document's specified area arrives at the designated position during the time period when the manuscript document is moving. The position of the rear edge of the specified area is determined only by performing the operation.

In such a structure, the image forming apparatus (sixth status) includes input means for inputting the length of the conveying direction for the manuscript document on a specified image area on which an image of the manuscript document should be formed, and third designation means for designating the position of conveying direction for the manuscript document on the specified image area in accordance with the length of the conveying direction for the manuscript document on the specified area inputted by the input means, and the signal inputted by pushing the divisional image forming key when the manuscript document is conveyed by the manuscript document conveying means and the front edge of the conveying direction for the manuscript document on the specified image area arrives at the designated position.

Furthermore, it may be desirable for cases where the lengths of the specified areas in the manuscript document conveying direction are almost equal to each other when the plural specified areas to be image-formed on the manuscript document are designated, if the rate of magnification/reduction previously set by the magnification/reduction key is "Equal", the specified area for forming the image to be formed on the recording paper is set in accordance with the length of one of the specified areas on the manuscript document in the document conveying direction.

Furthermore, when the division number of uniformly dividing the image on the manuscript document by the image dividing key, the image forming specified area for the image to be formed on the recording paper is set in accordance with the length obtained by dividing the entire length of the above manuscript document in the document conveying direction by the designated division number.

And further, if the rate of magnification/reduction previously set by the magnification/reduction key is "Not Equal", since the image forming specified area for the image to be formed on the recording paper corresponding to the above specified area on the manuscript document is set in accordance with the length of the recording paper in the paper conveying direction selected by the recording paper size selecting key, it is possible to respectively form the successive images of same length adjacently located on the specified areas of the manuscript document on the respective recording papers of the size corresponding to the previously set rate of magnification/reduction.

In such a structure, the image forming apparatus includes:

manuscript document conveying means, recording paper conveying means, a recording paper size selecting key, a magnification/reduction key for setting the magnification/reduction rate of forming the image, an image dividing key which is employed when the image on the manuscript document is divided and the divided image is formed on the recording paper, and the forming means for forming an image on the recording paper, setting means for setting image formation specifying area, wherein the setting means for setting image formation specifying area, when the rate of magnification/reduction set by the magnification/reduction key is equal to one, the image of the manuscript document on the specified areas to be image-formed which are successively adjacent to each other from the front tip end in the conveying direction with same length is formed on the recording paper, in accordance with the length of the conveying direction for the manuscript document on one specified area of the manuscript document or in accordance with the length obtained by dividing the entire length of the manuscript document in the conveying direction thereof by the designated divisional number in case that the divisional number of uniformly dividing the image of the manuscript document is designated with the image dividing key, and wherein the setting means for setting image formation specifying area, when the rate of magnification/reduction set by the magnification/reduction key takes a value other than one, the image of the manuscript document on the specified areas to be image-formed which are successively adjacent to each other from the front tip end in the conveying direction with same length is formed on the recording paper corresponding to the specified area on the manuscript document, in accordance with the length of the recording paper in the conveying direction selected by the recording paper size selecting key.

Furthermore, it may be desirable for an image on the manuscript document to be divided per the length of one of the above specified areas and the image corresponding thereto are formed in order on the recording papers by the image forming means, only by inputting the length of one of the specified areas needed to form the image in the document conveying direction.

In such a structure, the image forming apparatus includes:

manuscript document conveying means, recording paper conveying means, and image forming means, specified area length inputting means for inputting the length of the conveying direction of the manuscript document on an area to be image-formed for the manuscript document conveyed by the manuscript document conveying means, that is, one of the plural specified areas to be image-formed which are successively adjacent to each other from the front tip and in the conveying direction with same length, and image forming means for dividing the entire image on the manuscript document in the manuscript document conveying direction per each length of the specified area inputted by the specified area length inputting means, and for forming in order the image corresponding to each divided area on the recording paper by use of the image forming means.

Furthermore, it may be preferable to provide an image forming apparatus as mentioned before (sixth status), in which the specified area length inputting means is commonly used as recording paper size inputting means, and in which the entire image of the manuscript document is divided in the manuscript document conveying direction per each length of conveying direction of the recording paper inputted by the specified area length inputting means, and image formation is performed in order.

In such a structure, since an operation of inputting the length of one of the specified areas to be divided in the document conveying direction and another operation occur at the same time only by performing one operation of inputting the recording paper size it is possible to intend to improve the easiness of operating the machine.

Furthermore, it may be desirable to form the image on all specified areas on the recording paper without designating the specified area every time per each specified area on the manuscript document, only by, respectively, inputting the length of one of the above specified areas in the document conveying direction by the specified area length inputting means, and inputting the interval of the specified area by the specified area interval inputting means.

In such a structure, the image forming apparatus includes:

manuscript document conveying means, recording paper conveying means, and image forming means, means for selecting the recording paper size including means for inputting the length of the conveying direction for the manuscript document on an area to be image-formed of the manuscript document conveyed by the manuscript document conveying means, that is, one of the plural specified areas to be image-formed which are successively adjacent to each other in the conveying direction with same length at constant intervals, specified area intervals inputting means for inputting the intervals of the plural specified areas adjacent to each other in the conveying direction of the manuscript document, and image forming means for forming in order the images corresponding to the respective specified areas on the recording paper by use of the image forming means, in accordance with the length of the specified area and the interval between the specified areas respectively inputted by the specified area length inputting means and the specified area intervals inputting means.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
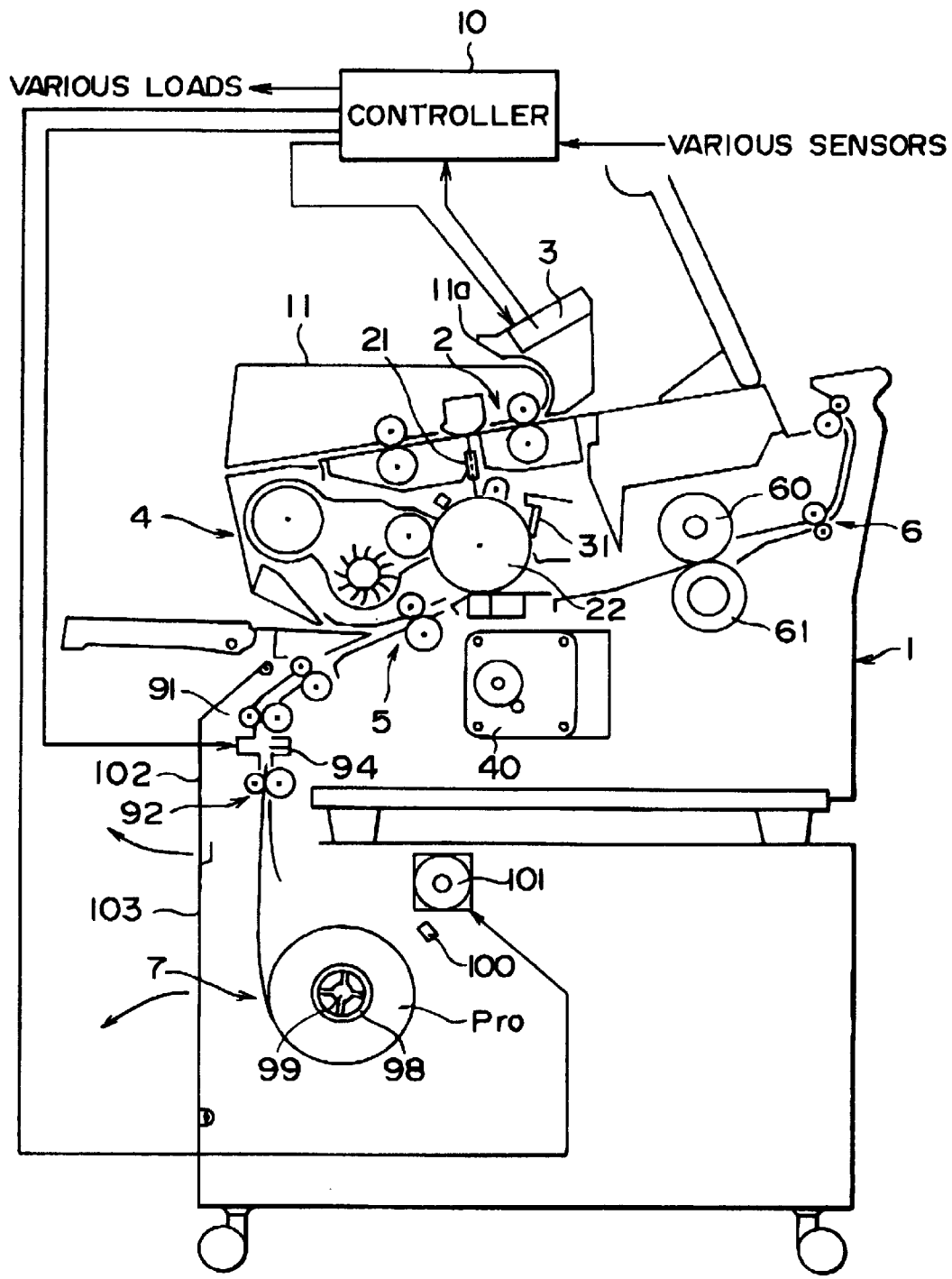
FIG. 1 is a side view of an entire copying machine system.
Figure 2:
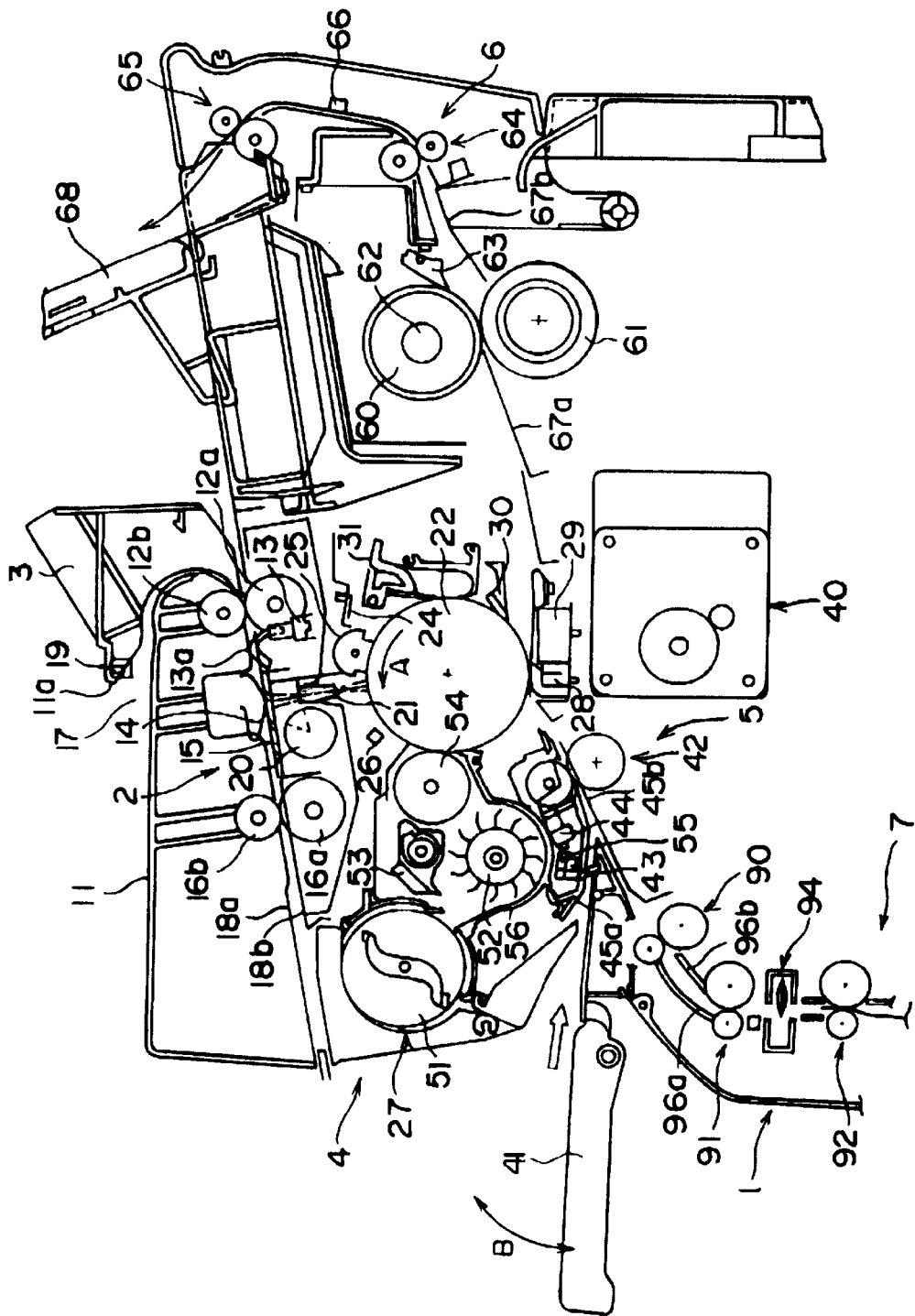
FIG. 2 is a side view of an image forming portion of the copying machine system.

FIG. 1 is an entire configuration diagram illustrating a copying machine system embodiment of an image forming apparatus according to the present invention. FIG. 2 is a configuration diagram illustrating a portion around an image generating unit of the copying machine.

The copying machine, image forming apparatus, includes a manuscript document conveying unit 2, an operation displaying unit 3, an image generating unit (image forming unit) 4, a recording paper conveying unit 5, a fixing paper discharging unit 6, and a rolled paper conveying unit 7.

In addition, this copying machine includes a controller 10 for controlling the copying machine and for designating a position of a conveying direction for a manuscript document on a specified image area. The designation is performed by the controller 10 recognizing an activation of a divisional copy key 79 (See FIG. 3), when the front edge and the rear edge of the conveying direction for the manuscript document on the specified image area on which the image of the manuscript document being conveyed by the manuscript document conveying unit 2 should be formed respectively arrive at the designated positions just under an inlet and portion 11a of the document table (stand) 11 respectively. The controller 10 also decides a paper size or the number of the recording paper sheets conveyed by the recording paper conveying unit 5 in accordance with the size (a length in the conveying direction in this example) and the number of the specified image areas both designated by the designation means.

The controller 10 includes a microcomputer comprising a central processing unit (CPU) having various decision and processing functions, a ROM in which various processing programs and fixed data are stored, a RAM which is a data memory in which processing data is stored, and an input-output circuit (I/O).

This controller 10 enters each of various signals when one of the various keys on the operation displaying unit 3 is pressed. In addition, it enters various signals at respectively predetermined timing sequences based on information from various sensors (FIG. 1) in the copying machine.

Further, the controller 10 outputs various display signals to various displaying portions in the operation displaying unit 3 and outputs a signal to a rolled paper cutter 94 in the rolled paper conveying unit 7 for cutting a rolled paper "Pro" by a predetermined length by driving the cutter 94. Still further, to a stepping motor 101, the controller 10 outputs a signal for conveying the rolled paper Pro by a predetermined amount while driving each conveying system of the rolled paper conveying unit 7 by driving the stepping motor.

The controller 10 also outputs a driving signal for driving various loads of the copying machine and for driving them at each predetermined timing sequences.

The controller 10 is arranged downward of a fixing roller 60 arranged in the fixing/paper discharging unit 6 in the main body of the apparatus 1 with main electrical units such as a power supply which are not shown.

As shown in FIG. 2, the manuscript document conveying unit 2 comprises a first manuscript document conveying roller 12a, a follow-up roller 12b rotatable in pressure contact with the first manuscript document conveying roller 12a, a contact glass 15, a back-reflecting plate 14, a second manuscript document conveying roller 16a, a follow-up roller 16b rotatable in pressure contact with the second manuscript document conveying roller 16a, a manuscript document inlet sensor 19, a manuscript document registration sensor 13 having a feeler 13a, a manuscript document table 11 which serves as a manuscript document conveying path, and various guide plates such as guide plates 18a and 18b.

The operation displaying unit 3 is arranged upward of the manuscript document conveying unit 2, having an input device used by an operator to enter various information, a display for displaying various operation states of the copying machine, and an alarm for making an audible alarm when an error occurs, though details are explained later.

Downward of the manuscript document conveying unit 2, the image generating unit 4 is arranged.

The image generating unit 4 comprises an exposing light source 20, a lens array 21, a photosensitive drum 22 rotatable in a direction indicated by an arrow A, a charge removing lamp 24, a charging charger 25, an eraser (partial charge removing) 26, a developing apparatus 27, a transferring charger 28, a separating charger 29, a separation claw 30, and a cleaner 31.

The developing apparatus 27 comprises a toner cartridge 51, a stirring roller 52, a developer flow path 53, a developing sleeve 54, a toner density sensor 55, a casing 56, and a toner supplying clutch which is not shown.

The paper conveying unit 5 near the image generating unit 4 comprises a paper table 41 which can be opened or closed in a direction indicated by an arrow B, a pair of paper registration rollers 42 arranged rotatable so as to be in pressure contact with each other in a vertical direction, a paper inlet sensor 43 having a feeler protruding on the paper conveying path, a paper registration sensor 44 having a feeler protruding on the paper conveying path in the same manner, various guide plates such as guide plates 45a and 45b constituting the paper conveying path, and a paper registration clutch which is not shown.

The fixing/paper discharging unit 6 is arranged in the back of the main body of the apparatus 1, and includes a fixing roller 60, a pressing roller 61 in contact with the fixing roller 60, a fixing heater 62, a fixing separation claw 63, a first pair of paper discharging rollers 64, a second pair of paper discharging rollers 65, a paper discharging sensor 66, guide plates 67a and 67b, and a stacker 68.

The rolled paper conveying unit 7 is set as an option to be removable from the main body of the apparatus 1.

The rolled paper conveying unit 7 comprises a pair of outlet rollers 90, a first pair of conveying rollers 91, a rolled paper cutter 94, a second pair of conveying rollers 92, various guide plates such as guide plates 96a and 96b forming a rolled paper conveying path, a spool 99 supporting the rolled paper Pro shown in FIG. 1, a paper end sensor 100 for detecting whether the rolled paper Pro remains, and a stepping motor 101 for driving conveying of the rolled paper Pro.

Corresponding to the rolled paper conveying unit 7, the main body of the apparatus 1 has doors 102 and 103 to be opened or closed when setting the rolled paper Pro to the spool 99 or removing jammed paper at its front panel, so as to be opened or closed in respective directions indicated by arrows in FIG. 1.

The rolled paper Pro is paper which is rolled around a roll shaft 98, and FIG. 1 shows a state where the roll shaft 98 is set to the spool 99 with the front edge of the paper pulled out so as to be put into a nip of the second pair of conveying rollers 92.

In FIG. 1, there is shown a main motor 40 for driving respective driving systems in the main body of the apparatus 1.

Figure 3:
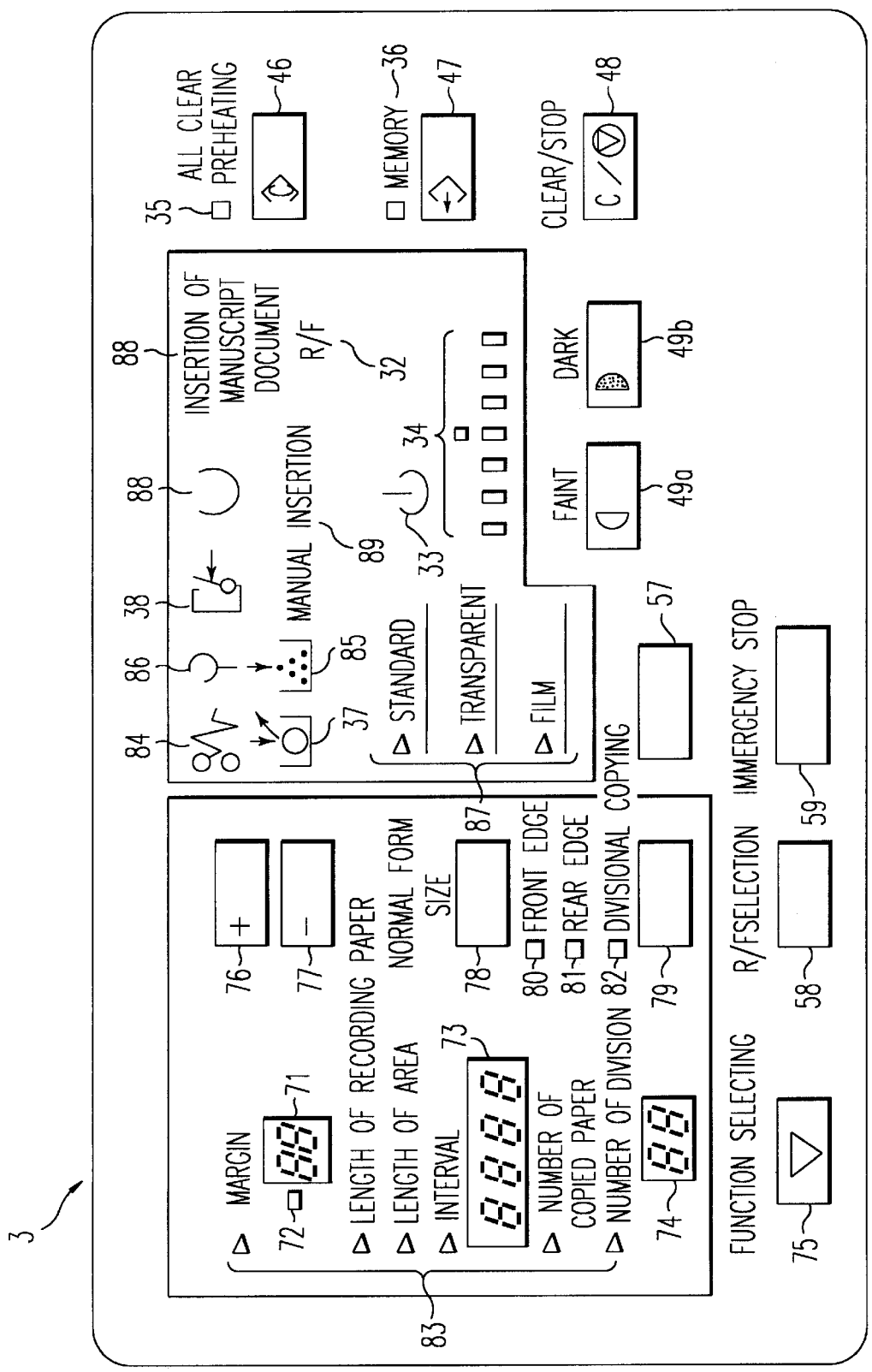
FIG. 3 is a plan view showing an operational display mounted on the copying machine system of FIG. 1.

The operation displaying unit 3, as shown in FIG. 3, includes a margin display 71 on which a numeral of up to two digits is displayed, a polarity display 72 which is lit when a margin is put on a rear edge, a display area 73 in which a numeral of up to four digits is displayed to indicate a length of recording paper, a length of a specified area equal to a length of a part required to be copied in a manuscript document conveying direction, or an interval, and a display area 74 on which a numeral of up to two digits is displayed to indicate the number of copies or the number of divisions equal to the number of the specified areas.

In addition, the operation displaying unit 3 has a function selecting key (input, display) 75, a "+" key 76, a "−" key 77, a normal form size key 78 for entering the length, and a divisional copying key 79 used for divisional copying.

Furthermore, there are provided a front edge display 80, a rear edge display 81, a divisional copying display 82, various function displays 83, a jamming display 84, a toner end display 85, an abnormality display 86, a paper type display 87, a manuscript document insertion permission display 88, a manual paper insertion permission display 89, an R/F paper start permission display 32, a warm-up display 33, a copy density display 34, a preheating display 35, a mode memory display 36, a rolled paper end display 37, and a door opening display 38.

Still further, also provided are an all clear/preheating key 46, a mode memory key 47, a clear/stop key 48, copy density switching keys 49a and 49b, a paper type selection key 57, an R/F selection key 58, and an emergency stop key 59.

The operation displaying unit 3 also has an alarm buzzer, though it is not shown in FIG. 3.

When the normal form size key 78 is pressed for entering a length of recording paper, a length of a specified area, or an interval in a manuscript document conveying direction of specified areas adjacent each other if there are a plurality of the specified areas, a recording paper size is selected so as to satisfy the above entered conditions. The selected size is displayed in the display area 74, based on data stored in the ROM of the microcomputer in the controller 10 in which the recording paper size and vertical/horizontal values of the recording paper are previously set, such as, for example, 841 mm of a vertical length for the A1 size and 420 mm of a horizontal length for the A2 size as normally employed.

Next, an explanation is made for an operation of partially copying only required specified areas of an image on a manuscript document by using this copying machine and operations of the units or sections used for the operation.

Several operation methods for partially copying only required specified areas of the image on the manuscript document are available and are described in order. Although an initial step of the operation depends on the operation method to be executed, selected initial values should be entered following a specification method of each selected specified area by using the "+" key 76, the "−" key 77, and the clear/stop key 48 on the operational display unit 3 shown in FIG. 3, such as an amount of margin to be formed in the recording paper, a length of the recording paper (a recording paper size equal to a length in the conveying direction), a length in the recording paper conveying direction of the required specified area, an interval between adjacent specified areas, the number of copies, and the number of divisions.

In this step, which item values are to be input are easily understood because one of the indicators (lamps) of the function displays 83 lights and the lighting shifts sequentially to the next indicator every time the function selecting key 75 is pressed.

First, an explanation is made below for a procedure of divisional copying (i.e., copying a plurality of specified areas in an image of an identical manuscript document into a plurality of recording papers, separate sheets, without specifying the length of the specified areas or the number of the divisions before the copying).

Pressing the divisional copying key 79 when the manual paper insertion permission display 89 and the R/F paper start permission display 32 are lit after the warm-up display 33 changes from the ON state to the OFF state causes the copying machine to complete the warm-up. Afterward, the divisional copying display 82 is lit to indicate the copying machine is operating in a divisional copying mode.

Pressing the R/F selection key 58 when the copying machine is in divisional copying mode causes the main motor 40 and the exposing light source 20 described in FIG. 2 to turn on, the pair of outlet rollers 90, the first pair of conveying rollers 91, and the second pair of conveying rollers 92 to begin to rotate, and the pair of paper registration rollers 42 also to rotate.

Thereafter, the paper registration sensor 44 is turned on due to the pivoted feeler of the paper registration sensor 44 being pushed up by the front edge of the rolled paper Pro and the pair of paper registration rollers 42 are stopped. In this state, the rolled paper Pro is stopped in a state that its front edge is put into the nip of the pairs of paper registration rollers 42. In this state, the manuscript document insertion permission display 88 in FIG. 3 is lit.

Then, the manuscript document is inserted with its image surface facing upward from a manuscript document insertion slot 17 where the manuscript document inlet sensor 19 is set as shown in FIG. 2. The manuscript document inlet sensor 19 then detects the manuscript document and lights a front edge display 80 (FIG. 3) indicating that the front edge of the specified area is ready to be specified.

The manuscript document inserted from the manuscript document insertion slot 17 passes through the first manuscript document conveying roller 12a and presses down the feeler 13a of the manuscript document registration sensor 13 to turn on the manuscript document registration sensor 13.

When the front edge of the specified area in the manuscript document passes through the point just under an inlet end 11a of the manuscript document table 11, an operator presses the divisional copying key 79. Then, the front edge display 80 in FIG. 3 is turned off, and in a short time the rear edge display 81 is turned on to indicate that the rear edge of the specified area can be specified.

The reason why the rear edge display 81 is not turned on concurrently with turning off the front edge display 80 is to reserve the minimum width of the divisional copy.

Pressing the divisional copying key 79 when the manuscript document is further conveyed and the rear edge of the specified area has reached just under the inlet end 11a in FIG. 2 sets the rear edge of the specified copy area. Then, the rolled paper cutter 94 cuts the rolled paper Pro according to the length of the specified area determined by the above specification of the front and rear edges (hereinafter, the rolled paper which has been cut is simply referred to as paper).

In the configuration shown in FIG. 2, after the rolled paper cutter 94 cuts the rolled paper Pro at a time corresponding to when the divisional copying key 79 is pressed, a margin is made in the side of the rear edge of the copy on the paper which has been cut by the predetermined length.

Therefore, by bringing the rolled paper cutter 94 closer to a photosensitive drum 22 from the position shown in FIG. 2 or moving the inlet end 11a to left in FIG. 2 (toward the front of the machine), the margin at the rear edge of the paper can be removed or reduced.

Conveying of the paper toward the photosensitive drum 22 is stopped once in a state that the front edge of the paper is put between the pair of paper registration rollers 42, and then it is conveyed at a timing sequence corresponding to the front edge of the specified area in the image of the manuscript document (the front edge of the image to be copied specified by pressing the divisional copying key 79 for a first time), therefore, the image in the above specified area is copied precisely in the predetermined position in the paper.

An image forming operation of the image forming unit 4 for the specified area is performed in the same manner as for inserting a manuscript document having the same length as for an area between the specified front and rear edges of the specified area from the manuscript document table 11 for copying.

In addition, according to the positions of the front and rear edges of the specified area, the charging charger 25, the exposing light source 20, a developing bias voltage applied to the developing sleeve 54, the transferring charger 28, the separating charger 29, and the separation claw 30 are controlled at predetermined timing sequences, respectively.

Specifically, the charging charger 25 is turned on only within a range of covering the specified area (the length in the paper conveying direction). The exposing light source 20 has a quantity of light corresponding to the copy density display 34 for an exposure of a range covering the specified area (the length in the paper conveying direction), while it has a greater quantity of light for an exposure of other parts compared with the exposure of the specified area.

Further, the developing bias voltage is equal to a voltage corresponding to the copy density display 34 within a range covering the specified area, while it is greater than the above voltage for other parts (a voltage whose absolute value is great and reduces the developing potential).

The transferring charger 28 and the separating charger 29 are set on only while the paper passes through these chargers. The separation claw 30 is turned on corresponding to the front edge of the paper, the side of the front edge is put into contact with the photosensitive drum 22, and the claw 30 is turned off before the rear edge of the paper passes through it (the separation claw is turned on only when the front edge of the paper passes through it).

The charge removing lamp 24 is lit only when the photosensitive drum 22 is rotating. The eraser 26 removes charges in an area other than the specified area on the photosensitive drum 22.

The image forming operation of the image forming unit 4 is executed by projecting a reflected light of a light from the exposing light source 20 toward the image (in the specified area) of the manuscript document and onto the surface of the photosensitive drum 22 which has been charged evenly by the charging charger 25, and an electrostatic latent image of the corresponding manuscript document range is formed thereon.

The electrostatic latent image is developed by the developing apparatus 27 and then toner is attached to the part of the electrostatic latent image according to the potential so as to form a toner image (i.e., a visible image). The toner image is transferred to the paper by the transferring charger 28 and the separating charger 29. After that, the paper on which the toner image is transferred is conveyed to the fixing/paper discharging unit 6.

The toner image on the paper is fixed (for example by solvent welding) by being pressed with a heated fixing roller 60 and the pressing roller 61 at the fixing/paper discharging unit 6.

After that, the paper is guided by the guide plate 67b to be conveyed to the first pair of paper discharging rollers 64, and passed through the second pair of paper discharging rollers 65, and is discharged on the stacker 68. In this operation, the paper discharging sensor 66 detects the passage of the paper to determine an occurrence of a jam based on the timing sequence of the paper passage and then determines whether or not the operation of the entire apparatus should be stopped.

In this manner, the paper to which the toner image is transferred is discharged onto the stacker 69, and electrical charges an area other than the area of the electrostatic latent image corresponding to the above specified area on the photosensitive drum 22 are removed by the eraser 26.

Next, rolled paper Pro is drawn out (payed-out) again at a given distance (the minimum length required for paper conveying) from the rear edge of the first paper which has been cut by the predetermined length, and in the same manner as for the above described first paper, when the front edge is put into the nip between the pair of paper registration rollers 42 (immediately after the paper registration sensor 44 is turned on), the front edge display 80 is turned on.

Afterward, in the same manner as for copying the specified area of the first sheet, pressing of the divisional copying key 79 when the front edge of the required specified area passes through the point just under the inlet end 11a of the manuscript document table 11 sets the front edge of the specified area. Additionally, when the rear edge of the specified area arrives at the point just under the inlet end 11a, pressing of the divisional copying key 79 for a second time sets the rear edge of the specified area. Repeating the above operational sequence whenever subsequent required specified areas pass through the point sets the new required specified area.

Suppose one forgets to press the divisional copying key 79 to designate the front edge of the specified area when the front edge display 80 is on, or to designate the rear edge of the specified area when the rear edge display 81 is on? In the first case, the pressing of the divisional copying key for the first time will result in the copying machine registering the rear portion of the desired specified area as the front edge of the specified area. Thus, the first case will now be handled as the second case discussed below.

In the second case, if only the front edge of the specified area is designated without designating the rear edge of the area, the rear edge of the manuscript document is regarded as the rear edge of the specified area so the copied image will be between the front edge (which was designated) and the rear edge of the manuscript document.

In the above-described designation method for specifying an area, it is seemingly impossible to copy a required area with the above normal operation when the area to be specified is located between the front edge of the manuscript document at detecting position of the manuscript document inlet sensor 19 and the detecting position of the manuscript document registration sensor 13. Therefore, in this case, a separate procedure is initiated by pressing the divisional copying key 79 for a time longer than two seconds. After which not only the divisional copying display 82, but also the front edge display 80 is lit before the manuscript document is inserted. In this state, the manuscript document can be copied from the beginning of an image at its front edge.

Since the divisional copying key 79 is used as an operation key for copying an image of a manuscript document from its front edge as described above in this copying machine of this embodiment, the time period of pressing the divisional copying key 79 should be within two seconds in normal uses (when the position of the specified area to be copied, measured from the front edge of the manuscript document, is behind the manuscript document inlet sensor 19 and the manuscript document registration sensor 13).

If the time period of pressing the divisional copying key 79 is within two seconds, only the divisional copying display 82 is lit as described above, and the front edge display 80 is not lit simultaneously with it.

The above explanation is made by giving an example for the operation of designating the front and rear edges of the specified area to be copied respectively with the divisional copying key 79 and operations of respective sections of the apparatus. In addition, in this copying machine, it is also possible to designate only the front edge of the specified area by using the divisional copying key 79, setting the rear edge by a length of recording paper. In this designation, a length between the front and rear edges of the specified area is regarded as a length of recording paper.

In the following, a description is made for the designation of the rear edge of the specified area by a length of recording paper.

In this case, the length of recording paper (length being measured in the conveying direction) for determining the rear edge of the specified area is specified before starting the copying by using respective keys which serve as paper size selection keys, such as the function selecting key 75, the "+" key 76, the "−" key 77, the normal form size key 78, and the clear/stop key 48. During a copy operation, only the front edge of the above specified area is specified by using the divisional copying key 79.

Other operations are the same as for the copying with designating both of the front and rear edges of the specified area by using the divisional copying key 79 as described above.

If the specified area to be copied is designated in this manner, the controller 10 in FIG. 1 designates the position of the above specified area in the conveying direction of the manuscript document based on a signal entered by pressing the divisional copying key 79 (FIG. 3) when the front edge of the specified area to be copied on the manuscript document in the manuscript document conveying direction passes through the point (the designated, predetermined position) just under the inlet end 11*a* of the manuscript document table 11 and the length in the conveying direction of recording paper selected by a key serving as the above paper size selection key.

In this designation method of the specified area, the position of the rear edge of the specified area need not be designated by using the divisional copying key 79, therefore, it saves steps for an operator.

Additionally, in this copying machine, if a plurality of specified areas having the same size are copied at the same intervals continuously, the required specified areas are automatically copied continuously without any other operation by an operator only by designating the front edge of the first specified area by using the divisional copying key 79, where the above paper length and the interval between the specified areas to be copied are previously entered before starting the copying.

In addition, an area can be specified with a length of the specified area in a conveying direction instead of the paper length. In this method, the length of the specified area is entered in the same manner as for the above paper length by using the function selecting key 75, the "+" key 76, the "−" key 77, the normal form size key 78, and the clear/stop key 48 which serve as input means for a length of a specified area set on the operation displaying unit 3. In this case, however, the length of the specified area must be equal to or shorter than ($\leq$) the length of the paper. If the length of the specified area is smaller than the length of the paper in the relationship between them, a margin is set in the side of the rear edge of the copied image on the paper.

According to this designation method of the specified area, only by entering a length of a specified area required to be copied in the manuscript document conveying direction and a front edge of the first specified area, an image on a manuscript document is divided in equal length units for each specified area and respective images are formed on papers sequentially by the image forming unit 4.

If a plurality of specified areas are adjacent to each other in the conveying direction and are repeated at given intervals with the same length on a manuscript document, an operator enters the interval of the specified area by using respective keys which serve as input means for an interval of a specified area such as the function selecting key 75, the "+" key 76, the "−" key 77, and the clear/stop key 48, in addition to the length of the specified area in the manuscript document conveying direction as described above. By this operation, all specified areas can be copied on paper without designating all of the specified areas on the manuscript document every time.

Further in this copying machine, to copy a manuscript document on which specified areas to be copied are adjacent to each other continuously from the front edge in the conveying direction and having the same lengths, the manuscript document length is divided into a plurality of areas and copied with an equal rate of magnification/reduction. An operator enters the number of divisions before copying by using image division keys set on the operation displaying unit 3 such as the function selecting key 75, the "+" key 76, the "−" key 77, and the clear/stop key 48 so that the length of the manuscript document can be equally divided.

Then, after entering the number of the divisions, the manuscript document is inserted from the manuscript document table 11 in FIG. 2 to the manuscript document insertion slot 17. Since the length of the manuscript document must be detected before copying in this case, conveying the manuscript document is first started by detecting the length of the manuscript document.

When the rear edge of the manuscript document arrives at the manuscript document inlet sensor 19, a manuscript document conveying motor which is not shown rotates the first manuscript document conveying roller 12*a* and the second manuscript document conveying roller 16*a* in a reverse direction, respectively to return the manuscript document toward the manuscript document table 11 with a reverse conveying operation. Then, when the rear edge of the manuscript document in its progressing direction passes through the feeler 13*a* of the manuscript document registration sensor 13, the motor rotates the first manuscript document conveying roller 12*a* and the second manuscript document conveying roller 16a in the right direction again to convey the manuscript document in a forward direction.

The following equation is used to detect length L of the manuscript document obtained in a process of detecting the length of the manuscript document as described above:

L=vt$_1$+L$_1$ [mm], where
v: Conveying speed (mm/sec) at which a manuscript document is conveyed in the forward direction to detect the length of the manuscript document in its conveying direction, t$_1$: Time period (sec) for which the manuscript document registration sensor 13 is set on while the manuscript document is conveyed in the forward direction to detect its length,
L$_1$: Length (mm) of a manuscript document conveying path between the manuscript document inlet sensor 19 and the manuscript registration sensor 13 (measured based on a position where each sensor is turned on).

Assuming that N is the number of the divisions, the length of each copy, L$_2$ is expressed by the following:

$$L_2 = L/N \quad \text{[Equation 1]}$$

where L$_2$ is not smaller than the minimum conveying length L$_0$ which allows conveying recording paper. Accordingly, if L$_2$<L$_0$, a manuscript document is not copied and discharged without any copying operations having been performed.

If the number of the divisions is specified like this for evenly dividing an image on a manuscript document to be copied by using the function selecting key 75, the "+" key 76, the "−" key 77, and the clear/stop key 49, the specified area whose image is formed on the recording paper is set based on the length of L$_2$ obtained by dividing the (full) length L of the manuscript document by the designated number of the divisions N.

As described above in order, if a specified area in a manuscript document is designated for copying in this copying machine, there are designation methods for the specified area such as a method of designating the positions of the front and rear edges of the specified area by using the divisional copying key 79 and a method of designating a length of recording paper, a length of the specified area, an interval of the specified area, or the number of divisions. For the above lengths or values not required to be entered in a selected designation method of the specified area, Os (zeros) are entered by using corresponding operation keys on the operation displaying unit 3.

These settings prevent the execution of the operations corresponding to the items for which Os are entered.

The copying machine in FIGS. 1 to 3 has been described without a magnification/reduction function, so an example is given below to describe a copying machine which is capable of divisional copying with a magnification/reduction function.

Figure 4:
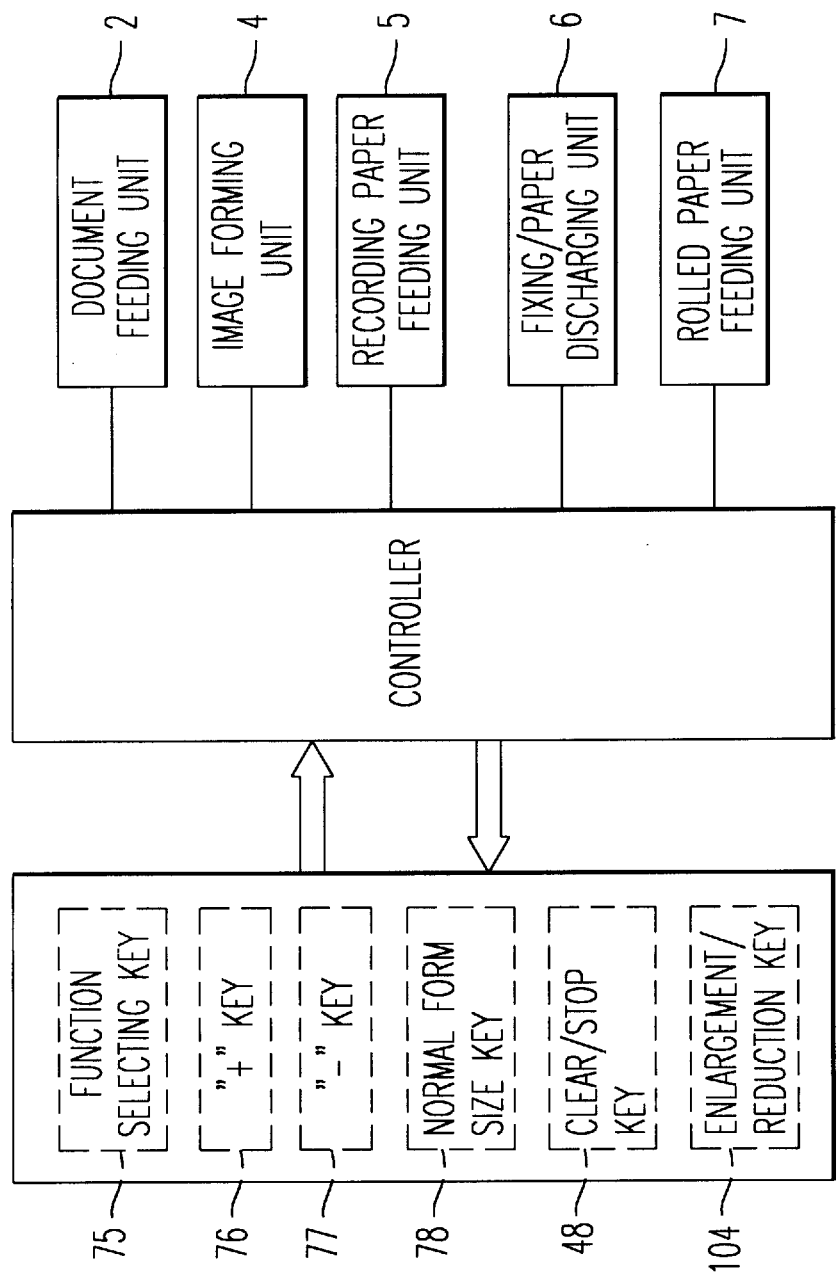
FIG. 4 is a block diagram of a main part of the copying machine system capable of performing a divisional copy with a magnification/reduction function.
Figure 5:
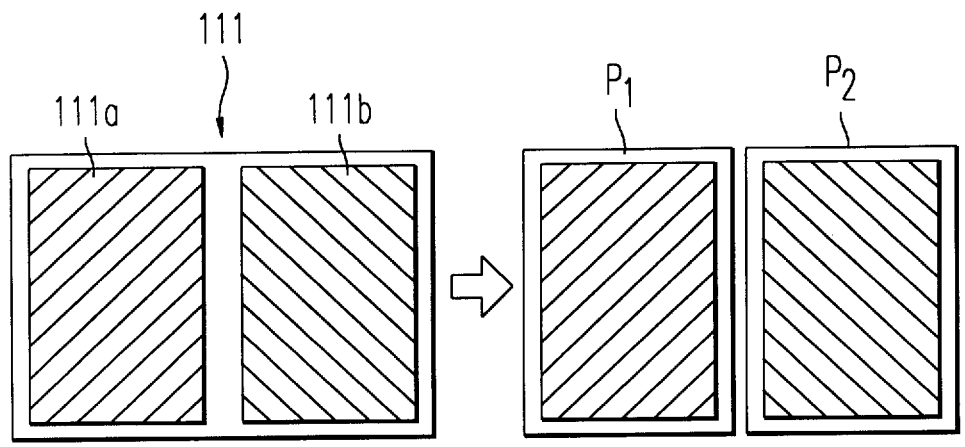
FIG. 5 is an outline view of right and left pages of an opened and looked-at manuscript document and two sheets of recording paper to which a conventional copying machine copies the manuscript document.
Figure 6A:
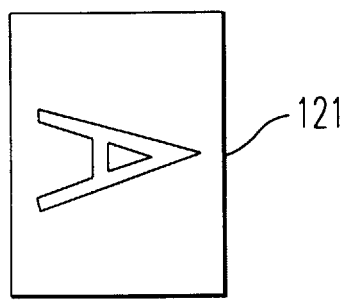
FIG. 6 is an outline view showing an example of divisionally receiving a facsimile transmitted image on three sheets of recording paper by use of a conventional facsimile device.
Figure 6B:
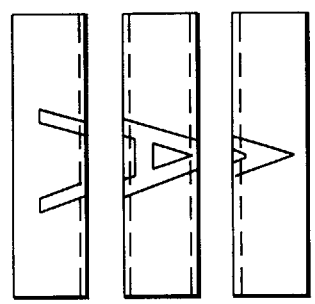
Figure 7A:
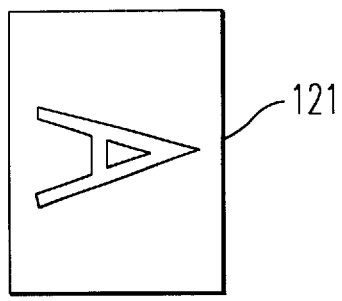
FIG. 7 is an outline view showing another example of divisionally receiving the transmitted image on two sheets of recording paper by use of a conventional facsimile device.
Figure 7B:
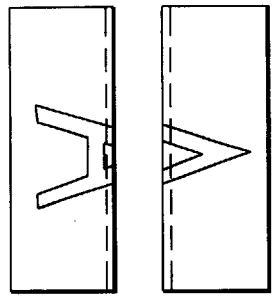

FIG. 4 is a block diagram illustrating only the main sections of an exemplary copying machine capable of divisional copying with magnification/reduction. In this exemplary copying machine, a manuscript document conveying system, an image forming system, and a paper conveying system are the same as for the copying machine described with reference to FIG. 1, therefore, the drawings and descriptions of the mechanical sections are omitted.

This copying machine comprises a manuscript document conveying unit 2 which is a manuscript document conveying medium and which is similar to that described for the copying machine of FIG. 1. A recording paper conveying unit 5 is a recording paper conveying medium. Keys on an operation displaying unit 3 such as a paper size selection key, a function selecting key 75 which serves as an image division key used for dividing an image on a manuscript document to form the image on recording paper, a "+" key 76, a "−" key 77, a normal form size key 78, and a clear/stop key 48, and a magnification/reduction key 104 are for setting a rate of magnification/reduction with which an image is formed.

In addition, there is provided a controller 10' used for setting an image forming specified area to be formed on recording paper based on a length obtained by dividing the full length of the manuscript document in the conveying direction by the designated number of divisions when the number of divisions for dividing evenly the image of the manuscript document is designated based on a length of the specified area in the manuscript document conveying direction on the manuscript document or the above respective keys which serve as image division keys, if rates of magnification/reduction set by the magnification/reduction key 104 are identical for a manuscript document on which the specified areas for image forming each having an identical length are repeated being adjacent to each other from the front edge in the conveying direction.

The controller 10' also sets an image forming specified area formed on the recording paper corresponding to the specified area on the manuscript document based on a length in the paper conveying direction selected by the above keys which serve as paper size selection keys if the rate of magnification/reduction set by the magnification/reduction key 104 is not equal one.

In this copying machine, to copy a manuscript document on which specified areas are repeated with the same length being adjacent to each other from the front edge in the conveying direction by dividing the manuscript document in units of the specified area with an equal rate of magnification/reduction, set the rate of magnification/reduction to equal one by using the magnification/reduction key 104 and enter the length of a specified area in the manuscript document conveying direction on the manuscript document by using an appropriate key on the operation displaying unit 3.

Then, the controller 10', sets the image forming specified area formed on recording paper (in this example, equal to the length of the specified area on the manuscript document due to an equal rate of magnification/reduction) based on the entered length of the specified area in the manuscript document conveying direction, and accordingly an image of each specified area, which has been sequentially divided, is copied on each recording paper.

In addition, there is another designation method for divisional copying of a plurality of specified areas on each recording paper, such as setting a rate of magnification/reduction to equal one by the magnification/reduction key 104 and designating the number of divisions for evenly dividing an image of a manuscript document in units of each specified area by using the above keys which serve as image division keys.

In this method, the copy length L$_2$ is obtained by dividing the manuscript document (full) length L in the manuscript document conveying direction by the entered number of divisions N, in equation 1 described above, set as an image forming specified area formed on recording paper, and accordingly an image of each specified area, which has been sequentially divided, is copied on each recording paper.

Further, to copy the above manuscript document by dividing it in units of each specified area with a rate of magnification/reduction other than equal one, an operator sets the range to a desired range by using the magnification/ reduction key 104 and by selecting a paper size (a length in the conveying direction) by using the above described keys functioning as paper size selection keys.

Then, the image forming specified area (a magnified or reduced size) formed on recording paper is set based on the entered length of recording paper in the conveying direction, and accordingly an image of each specified area, which has been sequentially divided, is copied on each recording paper.

In this divisional copying with a rate of magnification/ reduction other than equal to one, if it is attempted to determine the length of the image forming specified area according to the recording paper size so that the magnified or reduced image can be copied on the recording paper having an appropriate size for the image size without leaving a large margin on the recording paper, the calculation is troublesome.

Accordingly, in this case, it is also possible to set the size of the image forming specified area based on the size of a surface of the manuscript document.

As is apparent from the foregoing description of the embodiment according to the present invention, some merits or advantageous functional effects are made available by the present invention.

According to the image forming apparatus (of the first status), it is possible to form the image on the recording paper only by pushing the divisional image forming key and thereby designating the specified area on which the image of the manuscript document has to be formed when the front edge and the rear edge of the specified area in the document conveying direction arrive at the respective specified position during the time period when the manuscript document is moving.

Consequently, since it is not necessary for the operator to set the machine factors such as size and sheets number of the recording paper in accordance with the dividing of the image on the manuscript document, the operator can easily operate the machine and there is no fear that the necessary portion of the image to be formed is cut in half.

According to the image forming apparatus (of the second status), since the specified area on the manuscript document can be designated in accordance with the size of the recording paper by previously designating the size of the recording paper before forming the image, the designation of the specified area and the designation of the recording paper's size are commonly performed at the same time, and thereby the ease of operation is improved.

According to the image forming apparatus (of the third status), since the specified area can be designated in accordance with the length of the specified area in the document conveying direction, it is possible to easily perform the operation of forming the image with the rate of magnification/reduction not equal to "1" (not Equal) by use of the image forming apparatus having the function of magnification/reduction.

According to the image forming apparatus (of the fourth status), in the case of forming the image with the magnification/reduction rate of "1" (Equal) when there exist plural specified areas of same length in the document conveying direction, since the above-mentioned image forming specified area can be previously set by setting the image forming specified area for the image to be formed on the recording paper in accordance with the length of one of the specified areas in the document conveying direction, or by designating the division number by use of the image dividing key, it is not necessary to perform the operation of dividing the image on the manuscript document during the time period at the time of forming the image, and thereby it may be possible to intend to improve the easiness of operation.

On the other hand, in the case of forming the image with the magnification/reduction rate not equal to "1" (Not Equal), since the image forming specified area can be previously set only by designating the length of the recording paper in the paper conveying direction by use of the recording paper size selecting key, it is possible to easily form the image corresponding to the previously set magnification/reduction rate.

According to the image forming apparatus (of the fifth status), since it is not necessary to perform any operation after inputting the length of one of the specified areas in the document conveying direction, it is possible to improve the ease of operation.

According to the image forming apparatus (of the sixth status), since the operation of inputting the length of one of the specified areas to be divided and the operation of selecting the recording paper's size can be commonly performed at the same time only by performing one operation of inputting the recording paper's size corresponding to the length of the specified area, it is possible to improve the ease of operation.

According to the image forming apparatus (of the seventh status), in the case of, respectively, inputting the length of one of the specified areas in the document conveying direction by use of the specified area's length inputting means before starting the image formation and inputting the interval of the specified areas by use of the specified area's interval, it is possible to form the image on all of the specified areas on the recording paper without-designating the specified area on every occasion per each specified area on the manuscript document. Therefore, it is possible to improve the ease of operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image forming apparatus comprising:
    manuscript document conveying means for conveying a manuscript document having a manuscript image formed thereon;
    recording paper conveying means for conveying a recording paper;
    image forming means for forming respective carrier images corresponding to at least one specified area of said manuscript image on an image carrier;
    an operational display having a user-actuated divisional image forming key configured to designate the at least one specified area of the manuscript image;
    designation means for designating the at least one specified area of the manuscript image in response to successive actuations of said divisional image forming key when respective portions of said manuscript document arrive via said manuscript document conveying means at a predetermined position; and
    decision means for deciding at least one of a paper size of said recording paper and a number of sheets of said recording paper in accordance with a size and a number of said at least one specified image area.

2. The image forming apparatus of claim 1 wherein said recording paper conveying means comprises a paper roller configured to pay-out an amount of said recording paper corresponding to the at least one of a paper size and said number of sheets of recording paper decided by said decision means.

3. The image forming apparatus of claim 1, wherein said image forming means forms respective facsimile carrier images.

4. The image forming apparatus of claim 1, wherein said image forming means forms respective photocopier carrier images.

5. The image forming apparatus of claim 1, wherein said designation means designates at least two specified non equivalent length areas of said manuscript image.

6. The image forming apparatus of claim 1 further comprising a manuscript length determination mechanism configured to determine a length, L, of said manuscript document according through a first equation $L=vt_1+L_1$ where v is a velocity at which said manuscript document is conveyed by said manuscript document conveying means, $t_1$ is a time difference between when a front edge and a rear edge of said manuscript document respectively pass said predetermined position, and $L_1$ is a constant.

7. The image forming apparatus of claim 6 further comprising an image length determination mechanism configured to determine a length of said at least one specified area by a second equation $L_2=L/N$, where L is determined by said manuscript length determination mechanism and N is a number of specified areas.

8. An image forming apparatus comprising:

manuscript document conveying means for conveying a manuscript document having a manuscript image formed thereon;

recording paper conveying means for conveying a recording paper;

image forming means for forming respective carrier images corresponding to at least one specified area of said manuscript image on an image carrier;

an operational display comprising, a user-actuated divisional image forming key configured to generate a signal corresponding to a front edge of said at least one specified area of said manuscript image when said front edge arrives via said manuscript document conveying means at a predetermined position, and a recording paper size selecting key for selecting a length of the recording paper; and designation means for designating the front edge of said at least one specified area in response to the signal provided by the user-actuated divisional image forming key and a rear edge determined by said length of said recording paper.

9. An image forming apparatus comprising:

manuscript document conveying means for conveying a manuscript document having a manuscript image formed thereon;

recording paper conveying means for conveying a recording paper;

image forming means for forming respective carrier images corresponding to at least one specified area of said manuscript image on an image carrier;

an operational display comprising, a user-actuated divisional image forming key configured to generate a signal corresponding to a front edge of said at least one specified area of said manuscript image when said front edge arrives via said manuscript document conveying means at a predetermined position, and a recording paper size selecting key for selecting a size of said recording paper;

input means for inputting a length of said manuscript image to be formed by said image forming means on said image carrier; and designation means for designating the at least one specified area of said manuscript image based on the signal inputted by said input means and the size of the recording paper.

10. An image forming apparatus comprising:

manuscript document conveying means for conveying a manuscript document having a manuscript image formed thereon;

recording paper conveying means for conveying a recording paper;

a recording paper size selecting key for selecting a size of said recording paper;

image forming means for forming respective carrier images corresponding to at least one specified area of said manuscript image on an image carrier;

a magnification/reduction key configured to set a magnification or reduction rate of said manuscript image when actuated;

a user-actuated divisional image forming key configured to designate multiple portions of said manuscript image to be formed on said image carrier; and setting means for setting a size and number of said portions of said manuscript image to be formed on said recording paper based on said magnification or reduction rate set by said magnification/reduction key, wherein said at least one specified area is set in accordance with a length of one of the multiple portions of said manuscript image designated by said user-actuated divisional image forming key when said magnification or reduction rate is set to an equal value, where the length of the respective portions of said manuscript image is determined by dividing a length of the manuscript image by a number of multiple portions of said manuscript image to be formed, and said at least one specified area is set to correspond with the recording paper size when the magnification or reduction rate is set to a not-equal value.

11. The image forming apparatus of claim 10, wherein said setting means sets respective lengths of each of said at least one specified area to either be equal to a length designated by said user-actuated divisional image forming key for one of said at least one specified area or a uniformly divided length equivalent to a length of the manuscript document divided by a number of multiple portions of said manuscript image to be formed, when said rate of magnification/reduction is set to equal one by said magnification/reduction key.

12. An image forming apparatus as defined in claim 10, wherein said setting means sets the at least one specified area, when the rate of magnification/reduction set by said magnification/reduction key is a value other than one, to be successively formed adjacent to each other with same length on respective sheets of said recording paper in accordance with the size of the recording paper selected by said recording paper size selecting key.

13. An image forming apparatus comprising:

manuscript document conveying means for conveying a manuscript document having a manuscript image formed thereon;

recording paper conveying means for conveying a recording paper;

image forming means for forming respective carrier images corresponding to piecewise adjacent plural specified areas of said manuscript image on an image carrier;

specified length inputting means for inputting a manuscript image length in a conveying direction of said manuscript document, where said manuscript image length comprises respective equi-distance lengths of said piecewise adjacent plural specified areas; and image dividing means for dividing said manuscript image into the respective piecewise adjacent plural specified areas, and for respectively forming images corresponding to each piecewise adjacent plural specified areas on said recording paper.

14. An image forming apparatus as defined in claim 13, wherein:

said specified length inputting means comprises a recording paper size inputting means for inputting a recording paper length; and said image dividing means entirely divides said manuscript image into lengths corresponding to said recording paper length input by said specified area length inputting means, and respective of the subdivided manuscript images are successively formed by said image forming means in an order corresponding to said manuscript image.

15. An image forming apparatus comprising:

manuscript document conveying means for conveying a manuscript document having a manuscript image formed thereon;

recording paper conveying means for conveying a recording paper;

image forming means for forming respective carrier images corresponding to piecewise adjacent plural specified areas of said manuscript image on an image carrier;

specified length inputting means for inputting a length in a conveying direction for said manuscript document of an area of said manuscript document to be formed by said image forming means, wherein the plural specified areas have a common length and are positioned adjacent to each other at specified intervals;

specified area interval inputting means for inputting said specified intervals; and means for successively forming images corresponding to said respective specified areas on said recording paper in accordance with the length and the specified intervals respectively input by said specified length inputting means and said specified area intervals inputting means.

16. A method for forming images in an image forming apparatus comprising the steps of:

conveying a manuscript document having a manuscript image formed thereon;

conveying a recording paper;

forming respective carrier images corresponding to at least one specified area of said manuscript image on an image carrier;

designating a portion of said manuscript image so as to define the at least one specified area of the manuscript image with a user-actuated divisional image forming key;

designating the at least one specified area of the manuscript image comprising actuating successively said divisional image forming key when respective portions of said manuscript document arrive via said manuscript document conveying means at a predetermined position; and deciding at least one of a paper size of said recording paper and a number of sheets of said recording paper in accordance with a size and a number of said at least one specified image area.

17. The method of claim 16, wherein said step of designating the at least one specified area step comprises designating at least two specified areas having different lengths.

* * * * *